United States Patent [19]
Randall

[11] Patent Number: 5,978,916
[45] Date of Patent: Nov. 2, 1999

[54] METHOD, SYSTEM AND COMPUTER PROGRAM PRODUCT FOR UPDATING REGION-DEPENDENT SOFTWARE USING A COMMON UPDATE MODULE FOR MULTIPLE REGIONS

[75] Inventor: Grayson Warren Randall, Vestal, N.Y.

[73] Assignee: International Business Machines Corporation, Armonk, N.Y.

[21] Appl. No.: 08/978,304

[22] Filed: Nov. 25, 1997

[51] Int. Cl.$^6$ ................................................. G06F 13/00
[52] U.S. Cl. ........................... 713/200; 395/712; 709/221
[58] Field of Search ........................ 713/1, 200; 709/221; 395/712; 380/3–5

[56] References Cited

U.S. PATENT DOCUMENTS

| | | | |
|---|---|---|---|
| 4,634,807 | 1/1987 | Chorley et al. | 178/22.08 |
| 4,644,493 | 2/1987 | Chandra et al. | 364/900 |
| 4,866,769 | 9/1989 | Karp | 380/4 |
| 4,903,296 | 2/1990 | Chandra et al. | 380/4 |
| 5,008,814 | 4/1991 | Mathur | 709/221 |
| 5,109,413 | 4/1992 | Comerford et al. | 380/4 |
| 5,155,847 | 10/1992 | Kirouac et al. | 709/221 |
| 5,247,683 | 9/1993 | Holmes et al. | 709/221 |
| 5,359,730 | 10/1994 | Marron | 395/712 |
| 5,390,297 | 2/1995 | Barber et al. | 395/200 |
| 5,418,853 | 5/1995 | Kanota et al. | 380/5 |
| 5,432,647 | 7/1995 | Tateishi | 360/60 |
| 5,467,396 | 11/1995 | Schossow et al. | 380/4 |
| 5,513,260 | 4/1996 | Ryan | 380/3 |
| 5,577,232 | 11/1996 | Priem et al. | 709/302 |
| 5,732,275 | 3/1998 | Kullick et al. | 395/712 |

*Primary Examiner*—Thomas M. Heckler
*Attorney, Agent, or Firm*—Heslin & Rothenberg, P.C.

[57] ABSTRACT

Method, system and computer program product for updating pre-existing region-dependent software within multiple regions via a common software update without affecting the region-dependent nature of the software. The technique includes extracting region information from pre-existing region-dependent software on a user system; loading the non-functional software update onto the user system, the non-functional update being a common software update for the multiple regions; and merging the region information extracted from the pre-existing region-dependent software with the non-functional software update loaded onto the user system to produce a functional, updated region-dependent software on the user system. In one example, the user system comprises a digital video disc (DVD) PC system, and the distribution network is the internet. An activation module accompanies the common software update and accomplishes the extracting, loading and merging steps.

24 Claims, 2 Drawing Sheets

METHOD, SYSTEM AND COMPUTER PROGRAM PRODUCT FOR UPDATING REGION-DEPENDENT SOFTWARE USING A COMMON UPDATE MODULE FOR MULTIPLE REGIONS

TECHNICAL FIELD

The present invention relates in general to digital video disc technology and, more particularly, to a method, system and computer program product for updating region-dependent DVD software using a single update module placed onto a public network without compromising the unique region information incorporated within each DVD PC user system.

BACKGROUND OF THE INVENTION

Digital versatile disc (DVD) is an emerging technology which due to its nature, requires extensive encryption in order to protect the data, such as a motion picture, against unauthorized copying. DVD is a specification for the content of video, audio and other compressed data to be used as playback video, audio and, for example, subtitle data by a DVD decoder. The DVD video data is specified in the moving picture experts group (MPEG) standard (ISO/IEC 13818-2). As well as being represented by the standard, the data is also encrypted for protection.

Encryption is achieved using the industry's content scrambling system (CSS), which produces an encrypted, encoded data stream for DVD playback. The data stream can be decrypted, for example, by hardware licensed to perform CSS decryption. Conventionally, CSS decryption occurs at a PCI card, which also conventionally includes MPEG decompression of the encrypted, encoded data signal.

A DVD PC system or player is manufactured under license of the DVD consortium to include a copy protect module to protect distribution of DVD data worldwide. This technology includes scrambling of data and the concept of DVD regions throughout the world. Each digital video disc includes data that determines in which of the various defined regions of the world that DVD will play. Each DVD player or PC system sold in a given region must only play digital video discs that are allowed to be played in that region. Currently, the global market is divided into six DVD regions and each digital video disc produced contains data representative of regional information where the disc can be played.

In view of the region-dependent nature of DVD PC systems, there would be commercial advantage to a global technique to update the PC software of different DVD systems sold in the various DVD regions of the world without negatively effecting the region-dependent nature of the DVD systems.

DISCLOSURE OF THE INVENTION

This application addresses the problem of distribution of software updates, e.g., updates to the copy protection module, for DVD PC systems in various regions of the world. In particular, this application seeks to provide a single global update mechanism which can be used to update software modules which are region specific without affecting each DVD system's region specificity. Preferably, the single global update is distributed via a public network, such as the internet, to users in the multiple DVD regions.

Briefly described, the invention comprises in a first aspect, a method for updating pre-existing region-dependent software. The method includes: extracting region information from the pre-existing region-dependent software located within a user system; loading a non-functional software update onto the user system, the update comprising a non-functional software update for multiple regions; and, merging the region information extracted from the pre-existing region-dependent software with the non-functional software update loaded onto the user system to produce functional, updated region-dependent software.

In another aspect, the invention comprises a system for updating pre-existing region-dependent software. This system includes means for extracting region information from the pre-existing region-dependent software located within a user system, and means for loading a non-functional software update onto the user system. The update comprises a common non-functional software update for multiple regions. The system also has means for merging the region information extracted from the pre-existing region-dependent software with the non-functional software update loaded onto the user system to produce functional, updated region-dependent software.

A computer program product implementing the technique of the above-summarized method and system is also described and claimed herein.

Advantageously, a method, system or computer program product in accordance with the principles of this invention allows any user in the world to download a common software package, such as an updated copy protection module, and a corresponding activation module, and use the same process (i.e., instructions) to activate the updated module, while still maintaining each user's unique region information. The users will have no input or ability to change the region information on their system, which is a DVD requirement.

BRIEF DESCRIPTION OF DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, the present invention comprises a method, system and computer program product for updating pre-existing region-dependent software, such as the copy protect module employed within DVD PC systems. A DVD PC system comprises a software implementation of the hardware logic implemented within a DVD player.

As noted initially, the DVD consortium licenses technology which includes the concept of DVD geographical regions. PC original equipment manufacturers (OEM's) implementing DVD technology require six different copy protection modules, one for each of the six DVD regions existing today. These modules are equivalent with the exception of certain unique region information. It is the responsibility of the PC OEM to ship the correct software module associated with the destination region of that DVD PC system. For example, if a DVD PC system is shipped to the United States, then a Region 1 software module must be provided. If the DVD PC system is shipped to Japan, then a Region 2 software module must be provided. The PC OEM provides customers with one, and only one, software module within a given region per requirement of the DVD consortium.

One software module of particular importance is the copy protection module (CPM). DVD technology dictates extensive copy protection. One aspect of this requirement is addressed for DVD PC systems in co-pending, commonly assigned U.S. patent application Ser. No. 08/881,139, by Ciacelli et al., entitled "Apparatus, Method and Computer Program Product For Protecting Copyright Data Within a Computer System," the entirety of which is hereby incorporated herein by reference. Briefly, this patent describes a facility for re-encrypting CSS descrambled data within the CPU prior to its transfer from the CPU to maintain integrity of the copyrighted material, while still allowing software descrambling of the CSS encrypted data stream. Various techniques for establishing the encryption/decryption algorithm pair are presented therein.

With the above as background, the problem addressed herein concerns the distribution of software updates, and in particular updates for the copy protection module. Preferably, distribution of software fixes is accomplished by placing an updated module on a public network, such as the internet, and allowing customers to access, download, and install the updated software. However, in the case of region-specific modules, placing all six module updates on the public network would allow anyone to download software for any or all regions. This would allow users to update their DVD software to support all regions, which defeats the ability of the DVD consortium to distribute digital video discs based on a global model of multiple regions. Thus, presented herein is a novel facility for a PC OEM to distribute fixes to DVD region-specific software via a public network to customers in multiple DVD regions without impairing the region-dependent nature of the DVD systems.

Figure 1:
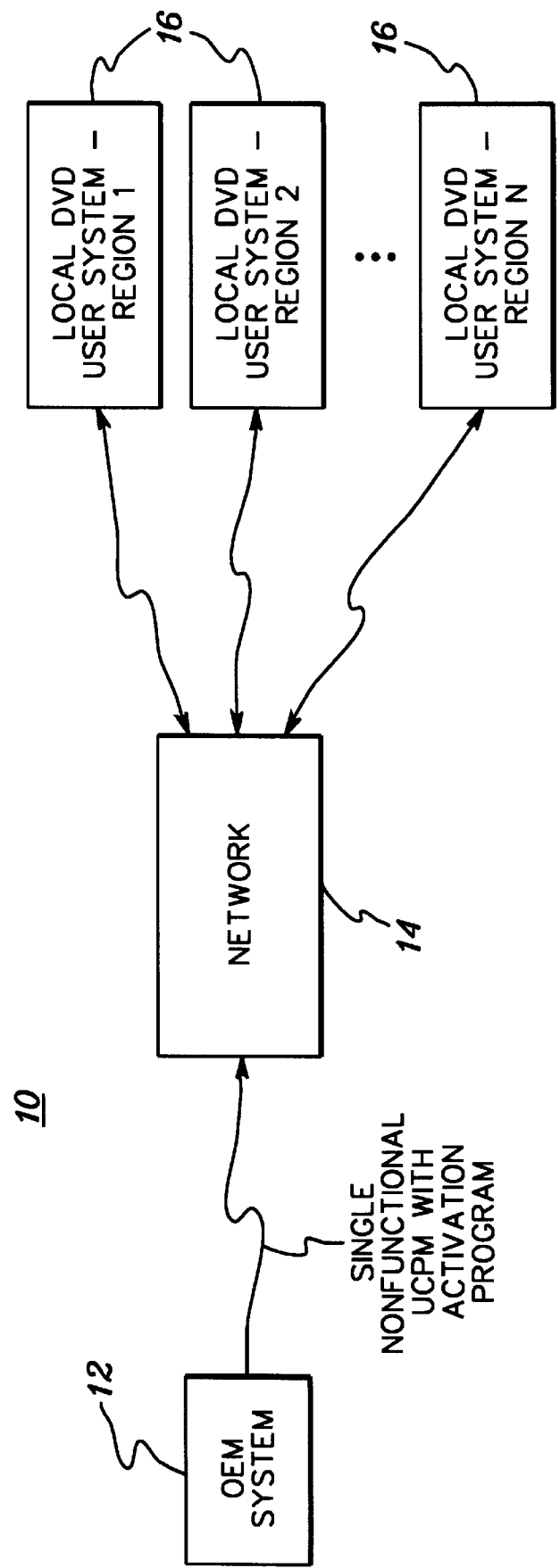
FIG. 1 depicts one example of a computing environment incorporating and using the software update facility of the present invention.

Assume that the PC OEM has shipped one and only one copy protection module (CPM) with each DVD system, and that the CPM is consistent with the DVD region as defined by the DVD consortium. In this case, the correct region information for that DVD system is contained within the CPM that exists (herein the "pre-existing copy protection module" (PCPM)) on the user's system. One embodiment of a computer environment 10 incorporating and using the update facility of the present invention is depicted in FIG. 1. Environment 10 includes an OEM system 12 coupled to a network 14 (such as the internet) and multiple local DVD user systems 16 distributed within N regions. Any given DVD region may contain a large number of local DVD user systems. Each local DVD user system is assumed to comprise a DVD PC system, such as that described in the above-designated co-pending application.

Generally, the solution of the present invention is to employ a common "updated copy protection module" (UCPM) with the appropriate region information removed such that the UCPM is non-functional. This non-functional UCPM is then placed on the public network for distribution. To activate the module, an activation program or module is also made available with the UCPM, which has several characteristics.

The activation module will have tamper-resistant methodology applied to it. For example, reference the above-designated, incorporated patent application for various tamper resistant processing approaches. This will protect the information contained within the module. Operationally, the activation program first locates the PCPM installed on the user system. If a pre-existing module is not found, or has been tampered with, the network available module (UCPM) will not be activated on the user's system and will be of no value.

If the activation program finds the PCPM, then it will validate the integrity of the existing module. Based on several imbedded tags, and tables of valid modules, the activation program can determine if this pre-existing software is valid, which software module it is (i.e., assuming multiple versions or revision levels exist), and the location within the module of the region information. If valid, the activation module extracts the region information therefrom.

At this point, the activation module loads the updated copy protection module (UCPM) obtained from the public network, to an appropriate location on the user's hard disc. The activation module then updates the new "non-functional" module (UCPM) with the region information obtained from the pre-existing copy protection module (PCPM) that is being updated. The new program is then functional and supports the appropriate DVD region, and the old software module is removed from the system by the activation program.

Figure 2:
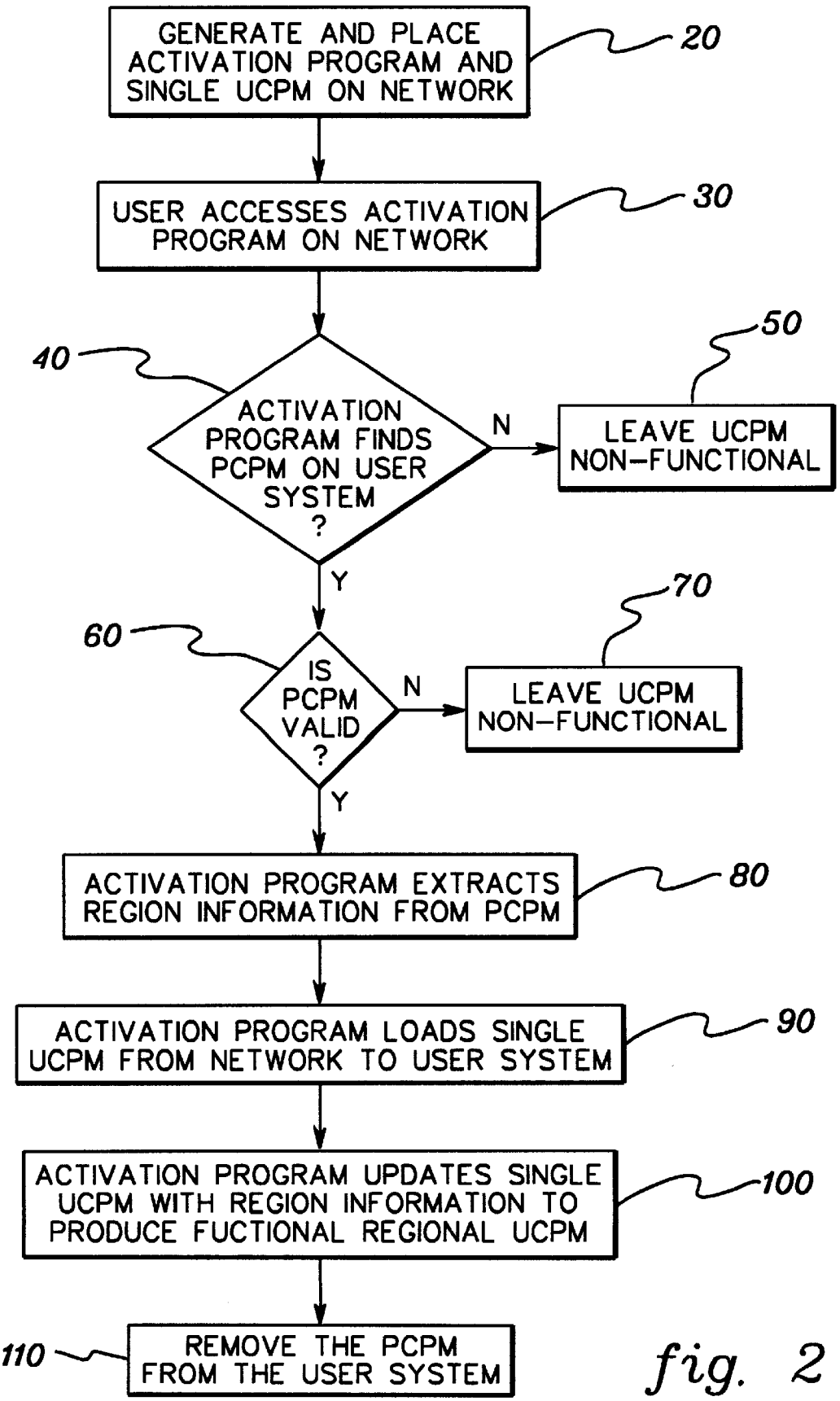
FIG. 2 is a flowchart of one embodiment of the software update facility of the present invention.

FIG. 2 presents a flowchart overview of the software update facility in accordance with the present invention. As shown, the single updated copy protection module (UCPM) is generated and placed on the network, along with the activation module 20. A remote user then accesses the activation program on the network 30. The activation program locates the pre-existing copy protect module (PCPM) on the user's system 40, e.g., by searching the user's hard drive for a known module name. If no PCPM is located, then the UCPM remains on the network and non-functional to the user 50.

Assuming that the PCPM is located on the user system, the activation module determines whether the PCPM is valid 60, e.g., by examining certain defined fields of the module. Again if no, the updated module remains on the network and non-functional to the user 70. If the PCPM is valid, then the activation program extracts the regional information from a predefined field of the PCPM 80. The activation program thereafter loads the single "non-functional" UCPM from the network onto the user's system 90. Although loading of the UCPM from the network to the user can precede evaluation of the PCPM and in particular locating of the region information, it is believed preferable to await extraction of proper region information before loading the update onto the user's network. Thereafter, the activation module updates the single UCPM by merging the region information into an appropriate field of the updated code to produce a functional, updated copy protect module 100 for the user's region of use. Finally, the activation program removes the PCPM from the user's system 110.

Those skilled in the art will note from the above discussion that presented herein is an approach which would allow any user in the world to download software, such as an updated copy protection module, and corresponding activation module, and use the same process (instructions) to activate the updated module, while still maintaining each user's unique region information. The users will have no input or ability to change the region information on their system, which is a DVD requirement.

The present invention can be included, for example, in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. A method for updating pre-existing region-dependent software, said method comprising:

extracting region information from the pre-existing region-dependent software located within a user system;

loading a non-functional software update onto the user system, said update comprising a common non-functional software update for multiple regions; and merging the region information extracted from the pre-existing region-dependent software with the non-functional software update loaded onto the user system to produce functional, updated region-dependent software.

2. The method of claim 1, wherein said pre-existing region-dependent software comprises a pre-existing copy protect module and said non-functional software update comprises an updated copy protect module.

3. The method of claim 1, further comprising providing said non-functional software update to multiple regions.

4. The method of claim 3, wherein said providing includes placing said common non-functional software update on a network, and wherein multiple user systems are coupled to said network within said multiple regions.

5. The method of claim 4, wherein said providing further comprises providing an activation module to said multiple regions in association with said non-functional software update, said activation module accomplishing said extracting, said loading, and said merging.

6. The method of claim 1, further comprising prior to said extracting, verifying presence of said pre-existing region-dependent software on said user system.

7. The method of claim 6, further comprising prior to said extracting, determining whether the pre-existing region-dependent software on said user system is valid, and if invalid, discontinuing said extracting, said loading and said merging.

8. The method of claim 1, further comprising removing the pre-existing region-dependent software from the user system subsequent to producing said functional, updated region-dependent software.

9. The method of claim 1, wherein said user system comprises a digital video disc (DVD) PC system, and wherein said loading comprises loading said non-functional software update onto the DVD PC system.

10. A system for updating pre-existing region-dependent software, said system comprising:

means for extracting region information from the pre-existing region-dependent software located within a user system;

means for loading a non-functional software update onto the user system, said update comprising a common non-functional software update for multiple regions; and means for merging the region information extracted from the pre-existing region-dependent software with the non-functional software update loaded onto the user system to produce functional, updated region-dependent software.

11. The system of claim 10, wherein said pre-existing region-dependent software comprises a pre-existing copy protect module and said non-functional software update comprises an updated copy protect module.

12. The system of claim 10, further comprising means for providing said non-functional software update to multiple regions, said means for providing comprising means for placing said non-functional software update on a network, and wherein multiple user systems are coupled to said network within said multiple regions.

13. The system of claim 12, wherein said means for providing further comprises means for providing an activation module to said multiple regions in association with said non-functional software update, said activation module comprising said means for extracting, means for loading, and means for merging.

14. The system of claim 10, further comprising means for verifying presence of said pre-existing region-dependent software on said user system prior to extracting of said regional information.

15. The system of claim 14, further comprising means for determining prior to said extracting whether the pre-existing region-dependent software on said system is valid, and if invalid, means for discontinuing processing of said means for extracting, means for loading and means for merging.

16. The system of claim 10, further comprising means for removing the pre-existing region-dependent software from the user system subsequent to producing said functional, updated region-dependent software.

17. The system of claim 10, wherein said user system comprises a digital video disc (DVD) PC system.

18. A computer program product comprising a computer usable medium having computer readable program code means therein for use in updating pre-existing region-dependent software, said computer readable program code means in said computer program product comprising:

computer readable program code means for causing a computer to affect extracting region information from the pre-existing region-dependent software located within a user system;

computer readable program code means for causing a computer to affect loading a non-functional software update onto the user system, said update comprising a common non-functional software update for multiple regions; and computer readable program code means for causing a computer to affect merging the region information extracted from the pre-existing region-dependent software with the non-functional software update loaded onto the user system to produce functional, updated region-dependent software.

19. The computer readable program code means of claim 18, wherein said pre-existing region-dependent software comprises a pre-existing copy protect module and said non-functional software update comprises an updated copy protect module.

20. The computer readable program code means of claim 18, further comprising computer readable program code means for causing a computer to affect providing said non-functional software update to multiple regions across a network, and wherein multiple user systems are coupled to said network within said multiple regions.

21. The computer readable program code means of claim 20, wherein said computer readable program code means for causing a computer to affect providing further comprises computer readable program code means for causing a computer to affect providing an activation module to said multiple regions in association with said non-functional software update, said activation module comprising said computer readable program code means for causing a computer to affect said extracting, said loading and said merging.

22. The computer readable program code means of claim 18, further comprising computer readable program code means for verifying presence of said pre-existing region-dependent software on said user system prior to extracting of said regional information.

23. The computer readable program code means of claim 22, further comprising computer readable program code means for causing a computer to affect determining whether the pre-existing region-dependent software on said user system is valid, and if invalid, for discontinuing said extracting, said loading and said merging.

24. The computer readable program code means of claim 18, wherein said user system comprises a digital video disc (DVD) PC system.

* * * * *